(12) United States Patent
Recasens et al.

(10) Patent No.: US 12,657,535 B2
(45) Date of Patent: Jun. 16, 2026

(54) AUTOMATED SUPPLY CHAIN DEMAND FORECASTING

(71) Applicant: Coupa Software Incorporated, San Mateo, CA (US)

(72) Inventors: Javier Recasens, Atlanta, GA (US); Prasanna Kumar Ragavan, Ann Arbor, MI (US)

(73) Assignee: Coupa Software Incorporated, Foster City, CA (US)

( * ) Notice: Subject to any disclaimer, the term of this patent is extended or adjusted under 35 U.S.C. 154(b) by 0 days.

(21) Appl. No.: 18/605,074

(22) Filed: Mar. 14, 2024

(65) Prior Publication Data

US 2024/0220891 A1 Jul. 4, 2024

Related U.S. Application Data

(62) Division of application No. 17/708,985, filed on Mar. 30, 2022, now abandoned.

(60) Provisional application No. 63/169,017, filed on Mar. 31, 2021.

(51) Int. Cl.
| | |
|---|---|
| *G06Q 10/06* | (2023.01) |
| *G06Q 10/0631* | (2023.01) |
| *G06Q 10/067* | (2023.01) |
| *G06Q 10/08* | (2023.01) |
| *G06Q 30/0202* | (2023.01) |

(52) U.S. Cl.
CPC ..... *G06Q 10/06315* (2013.01); *G06Q 10/067* (2013.01); *G06Q 10/08* (2013.01); *G06Q 30/0202* (2013.01)

(58) Field of Classification Search
CPC ............................. G06Q 10/067; G06Q 10/08
See application file for complete search history.

(56) References Cited

U.S. PATENT DOCUMENTS

| | | | | |
|---|---|---|---|---|
| 2002/0169657 A1* | 11/2002 | Singh | ..................... | G06Q 10/06 705/7.31 |
| 2004/0006447 A1* | 1/2004 | Gorin | ............... | G01R 31/31707 702/181 |
| 2004/0103018 A1* | 5/2004 | Kim | ..................... | G06Q 10/087 705/7.31 |
| 2005/0288993 A1* | 12/2005 | Weng | ..................... | G06Q 10/06 705/7.31 |

(Continued)

OTHER PUBLICATIONS

P. K. T, M. T. N and R. S. Hegadi, "Literature Review on Big Data Analytics and Demand Modeling in Supply Chain," 2018 International Conference on Electrical, Electronics, Communication, Computer, and Optimization Techniques (ICEECCOT), Msyuru, India, 2018, pp. 1246-1252 (Year: 2018).*

(Continued)

*Primary Examiner* — Beth V Boswell
*Assistant Examiner* — Tyrone E Singletary
(74) *Attorney, Agent, or Firm* — Baker Botts L.L.P.

(57) ABSTRACT

In an embodiment, a method includes receiving training data representing historic consumer demand for products, detecting changepoints in that data that may be associated with disruptive events, identifying relevant data for modeling, performing clustering, processing configuration information, training one or more machine learning models that are capable of evaluating other received data more accurately, and outputting results to a user display device.

6 Claims, 8 Drawing Sheets

(56)         References Cited

U.S. PATENT DOCUMENTS

| | | | |
|---|---|---|---|
| 2014/0188748 A1* | 7/2014 | Cavoue | G06Q 10/08 |
| | | | 705/333 |
| 2014/0278728 A1* | 9/2014 | Hollenbach | G06Q 10/0635 |
| | | | 705/7.28 |
| 2017/0039500 A1* | 2/2017 | Leidner | G06Q 10/0833 |
| 2020/0134642 A1 | 4/2020 | Morgan | |
| 2021/0090163 A1* | 3/2021 | Rabinovitch | G06Q 10/0635 |
| 2021/0110413 A1* | 4/2021 | Ouellet | G06Q 30/0202 |
| 2021/0374632 A1* | 12/2021 | Côté | G06N 20/00 |
| 2022/0180274 A1 | 6/2022 | Makhija | |
| 2023/0342796 A1 | 10/2023 | Madhusudhanan et al. | |
| 2023/0401592 A1 | 12/2023 | Khanafer et al. | |

OTHER PUBLICATIONS

M. A. Khan et al., "Effective Demand Forecasting Model Using Business Intelligence Empowered With Machine Learning," in IEEE Access, vol. 8, pp. 116013-116023, 2020 (Year: 2020).*
Javier Recasens, "Forecasting in Times of Disruption", pub. online by Opex Analytics in the Opex Analytics Blog, dated Apr. 2, 2020, 8 pages.

* cited by examiner

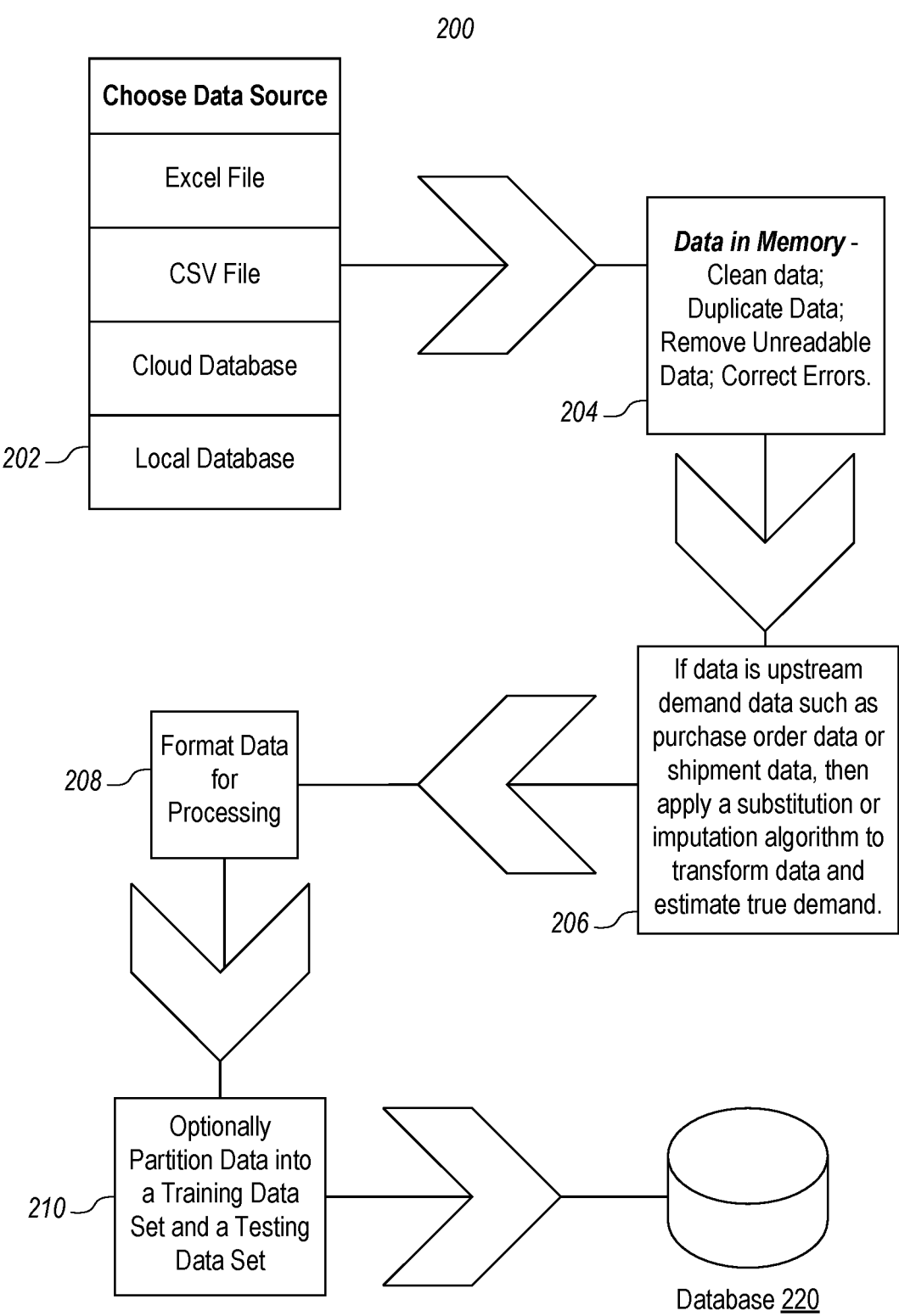

*200*

Choose Data Source

Excel File

CSV File

Cloud Database

202 — Local Database

204 — *Data in Memory* - Clean data; Duplicate Data; Remove Unreadable Data; Correct Errors.

206 — If data is upstream demand data such as purchase order data or shipment data, then apply a substitution or imputation algorithm to transform data and estimate true demand.

208 — Format Data for Processing

210 — Optionally Partition Data into a Training Data Set and a Testing Data Set

Database 220

AUTOMATED SUPPLY CHAIN DEMAND FORECASTING

BENEFIT CLAIM

This application claims the benefit under 35 U.S.C. § 120 as a divisional of application Ser. No. 17/708,985, filed Mar. 30, 2022, which claims the benefit under 35 U.S.C. § 119(e) of provisional application 63/169,017, filed Mar. 31, 2021, the entire contents of which are hereby incorporated by reference for all purposes as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

TECHNICAL FIELD

One technical field of the present disclosure is computer-assisted forecasting of demand of goods or materials in complex supply chains. Another technical field is predictive modeling, including time series analysis. Another technical field is supply chain management. Another technical field is logistics as applied to disruptive conditions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Demand forecasting is a field of predictive data analytics directed to optimizing supply chain decisions by predicting customer demand using computer-implemented algorithms. Demand forecasting may be a part of production planning, inventory management, marketing strategy development, and various other aspects of corporate decision-making. Demand forecasting methods may involve qualitative or quantitative assessment of pertinent data, including historical sales data. Demand forecasting may be accomplished by building a model and testing that model. A variety of techniques may be used to validate a model through testing.

A statistical technique which may be used in demand forecasting is time series analysis. Time series analysis involves forecasting future behavior by analyzing past behavior. Time series analysis may be used to predict future demand for certain products based, at least in part, on past sales of those products. Time series analysis may identify data features such as trends, seasonality, cyclicity, and irregularity.

Supply chain networks may involve distribution centers, suppliers, vendors, and manufacturers, to utilize to meet consumer demand for a particular finished good. Supply chain network techniques often employ multiple levels of interdependence and connectivity between sites within the supply chain network. Multiple models or techniques may be utilized to predict the behavior and interactions between these sites to optimally deliver goods and services to various points or locations along the supply chain network.

Individual sites within a supply chain network, for example manufacturing or production facilities, often feature complex interdependence and connectivity within the site due to multiple finished goods that may be manufactured at the site. Accurate forecasting of demand may require baseline data describing interactions between existing inventory, demand for finished goods, supply of raw materials, production processes each having a plurality of production process steps, production periods, and on-site equipment that must be managed at a particular site. Thus, an entity may incur excess use of materials, power, chemical resources, machine time, or other physical effects at individual sites along a typical supply chain if demand forecasting fails to consider internal and external factors that impact a particular site.

An effective solution requires computer implementation to manage issues of scale and real-time response timing that accounts for factors both internal and external to particular sites in a supply chain network. In some environments, buyer computers or buyer accounts may interoperate with dozens to hundreds of different supply chains, each with dozens to hundreds of nodes, in association with thousands to tens of thousands of products or components. Each node in all these complex supply chains may be associated with different production requirements that impact demand factors. Furthermore, vast data about external events can rapidly impact the accuracy of demand forecasting. Disruptive events such as obstruction of critical canals (Suez, Panama), pandemic or epidemic, or natural disasters can occur with little warning and rapidly render forecasts based on past data invalid. Even given this level of complexity, buyer computers require real-time responses to queries about demand. Buyer accounts need the ability to add, delete, or rearrange data describing internal or external demand factors while receiving a real-time response to an updated query for a demand forecast.

Fulfilling these requirements with a human-based solution has become impractical. If a solution could provide automated means of managing millions of data items, while still supporting real-time response, it would represent a practical application of machine-based computing technology that should gain widespread use across industry.

SUMMARY

The appended claims may serve as a summary of the invention.

BRIEF DESCRIPTION OF THE DRAWINGS

In the drawings:

FIG. 2 illustrates an example process for preparing a training data set.

DETAILED DESCRIPTION

Figure 1:
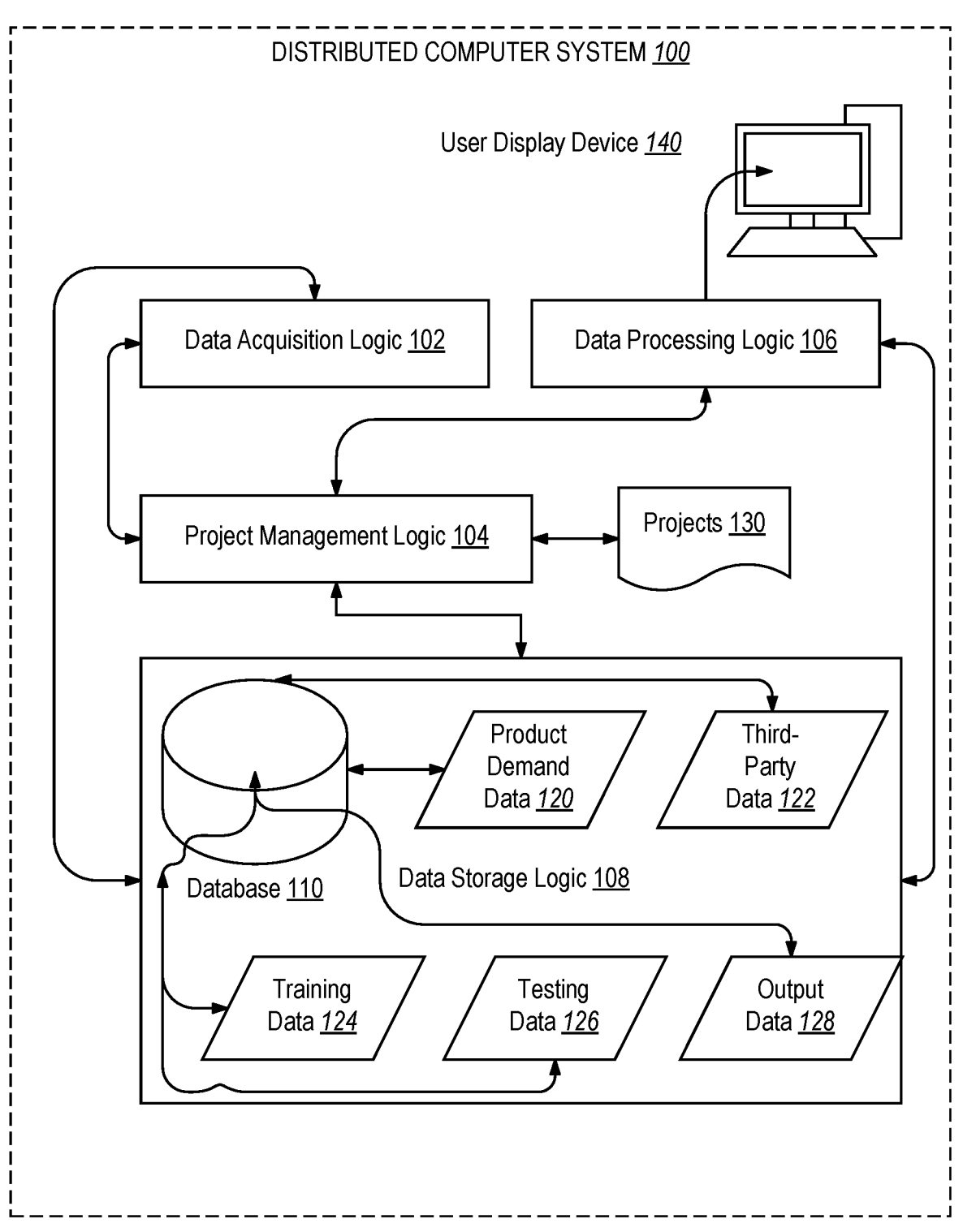
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. GENERAL OVERVIEW
2. EXAMPLE IMPLEMENTATIONS OF COMPUTER SYSTEM AND PROGRAM FLOW
   2.1 COMPUTER SYSTEM OVERVIEW
   2.2 TRAINING DATA PREPARATION
   2.3 DISRUPTION-RESISTANT DEMAND PREDICTION OVERVIEW
   2.4 IDENTIFYING RELEVANT DATA & CLUSTERING
   2.5 CONFIGURATION INSTRUCTIONS & FLEXIBILITY
3. IMPLEMENTATION EXAMPLE—HARDWARE OVERVIEW

1. General Overview

When a highly disruptive event occurs, historical data may be insufficient for computer-implemented modeling of the future. One example of an incredibly disruptive event is the COVID-19 pandemic of 2019-2021 which has radically impacted consumer behavior, greatly changing demand for a variety of products and services and thereby creating enormous disruption and uncertainty in many industries' operations; other disruptive events could similarly affect demand and this disclosure is not limited to the context of pandemic. Companies have seen demand surge, plummet, or sometimes both, and the resulting confusion makes it hard for their supply chain teams to react. In an embodiment, this disclosure presents, among other things, novel time series forecasting methods and systems for predicting consumer demand for products under disruptive conditions.

In an embodiment, a novel computer-implemented method is presented for implementing technical machine learning solutions to the technical problem of machine learning model development, validation, and deployment in the domain of predictive modeling. In an embodiment, the disclosure presents solutions implemented via client-server Software as a Service (SaaS) techniques or distributed computer systems generally. In other embodiments, a variety of novel systems are presented for predicting consumer demand. In other embodiments, a diverse array of systems may be used to implement the novel methods presented in this disclosure.

In an embodiment, a distributed computer system is programmed to receive training data representing historic consumer demand for products, to detect changepoints in that data that may be associated with disruptive events, to identify relevant data for modeling, to perform clustering, to process configuration information, to train one or more machine learning models that are capable of evaluating other received data more accurately, and to output results to a user display device.

2. Example Implementations of Computer System and Program Flow 2.1 Computer System Overview In an embodiment, an online distributed computer system or platform for predictive modeling provides a system for generating product demand models based on historical product demand data and using those models to predict future customer demand for products. In an embodiment, the platform comprises functionality for importing data, preparing training data sets, training, validating, and executing models, and visualizing results.

FIG. 1 illustrates a distributed computer system showing the context of use and principal functional elements with which one embodiment could be implemented.

FIG. 1, and the other drawing figures and all of the description and claims in this disclosure, are intended to present, disclose and claim, among other things, a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a distributed computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

In an embodiment, distributed computer system 100 comprises data acquisition logic 102 coupled to project management logic 104 that is programmed to store project data in persistent storage, for example, in organizational units such as projects 130. The project management logic 104 may also be coupled to data storage logic 108 which is programmed to manage the storage of data across the distributed computer system, for example in database 110. In an embodiment, data acquisition logic 102 is programmed to receive input signals specifying network locations of data sources or data files, to access and read the specified data sources or data files, and to import records from the specified data sources or data files into memory comprising database 110 or other memory, including, but not limited to, networked memory or cloud storage memory.

In an embodiment, projects 130 may be stored in database 110 of distributed computer system 100, which may be a relational database. In other embodiments, projects 130 may be stored in other memory accessible by distributed computer system 100. In an embodiment, database 110 stores a variety of data comprising product demand data 120, third-party data 122, training data 124, testing data 126, and output data 128.

In an embodiment, distributed computer system 100 further comprises data processing logic which is coupled to the project management logic 104 and the data storage logic 108, and which is programmed to process data accessible by distributed computer system 100. The data processing logic 106 may be programmed to initialize, train, execute, and validate machine learning models or statistical models. In an embodiment, machine learning models take as input training data 124 and third-party data 122. The data processing logic may first transform the product demand data 120 into one or more training data 124 sets. In an embodiment, a subset of the product demand data 120 may be used as training data 124 while a disjoint subset of the product demand data 120 is used as testing data 126 to test, validate, or otherwise assess the efficacy of a machine learning model or statistical model. In an embodiment, the data processing logic 106 is configured to visualize and display the output data 128 to a user display device 140.

2.2 Training Data Preparation

FIG. 2 illustrates a flow diagram of a computer-implemented system preparing a training data set for product demand forecasting. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In one embodiment, the present disclosure provides techniques to improve short-term demand forecasts for tactical response through novel time series analysis methodologies and with the help of external data. In addition to improving short-term demand forecasts, the disclosed methods and systems may allow a user to identify demand patterns unfolding across an entire product portfolio. In an embodiment, product portfolios or subsets thereof selected for analysis may correspond to projects 130 as illustrated in FIG. 1. Management of projects 130 and the coordination of processes required for training data set preparation may be controlled by project management logic 104 as further illustrated in FIG. 1.

In an embodiment, product demand data may comprise data representing historical customer demand for a single product, a product line of a company, a portfolio of related products, all products sold or offered for sale by a company or one of its subdivisions or subsidiaries, or products sold or offered for sale by any number of related or unrelated companies or individuals. In other embodiments, the product demand data may comprise any other data representing historical demand for products, or even services. In an embodiment, product demand data corresponds to product demand data 120 (FIG. 1) acquired by data acquisition logic 102 and stored in database 110 of distributed computer system 100 according to data storage logic 108, as illustrated in FIG. 1. In an embodiment, database 220 (FIG. 2) corresponds to database 110 (FIG. 1).

In an embodiment, product demand data may be associated with a geographical location. In these embodiments, product demand data may be global data, comprising historical demand data for one or more products in a plurality of countries around the world. In other embodiments, product demand data may be limited to a particular geographic region, country, state, province, city, or any other geographic or political subdivision.

In an embodiment, the product demand data comprises a dataset representing downstream consumption data rather than data from purchase orders or shipments. In times of disruption, such as during a global pandemic like COVID-19, downstream consumption data (e.g., Point of Sale (POS) data) may be a more accurate representation of actual customer demand than other demand data, because many demand transactions (e.g., consumer store visits) with zero sales of a given item may reflect a lack of sufficient stock as opposed to a lack of demand.

In other embodiments, a variety of other data sets, such as data concerning purchase orders or shipment data, may be used for a variety of reasons, including an inability to obtain downstream consumption data. In an embodiment, at block 206, a true demand may be estimated by imputing sales with a variety of imputation algorithms or substitution methods. In embodiments, imputation and substitution methods include, but are not limited to: (1) methods that account for substitution effects to estimate lost sales due to stock outs, (2) methods that use a demand rate for imputation, (2) if visits per store data is unavailable, estimating the basket of a visitor and the approximating the potential demand, or (4) if an item is primarily sold online and the item is out of stock, approximating lost sales by utilizing historical site visits of a specific product to a finalized sales ratio in conjunction with current site visit data. In other embodiments, other methods of estimating true demand using imputation or substitution may be used. The following is a non-limiting example of a method that accounts for substitution effects to estimate lost sales due to sock outs. If toilet paper of brand "A" is out of stock and toilet paper of brand "B"'s demand is higher by 40%, this percentage can be split by the historical sales of brand "A" and brand "B" to estimate brand "A" and "B"'s true demand. One of ordinary skill in the art, will recognize that a variety of other imputation or substitution methods may be used to estimate true demand when, for example, POS data is not available.

In an embodiment, product demand data may be data related to sales or demand from a previous year or series of years. In other embodiments product demand data may be data related to historical sales or demand tabulated with respect to any other unit of time, or even contain estimates, interpolations, or projections from any period of time.

In an embodiment, product demand data, may be tagged, labeled, or otherwise associated with not only a level of demand or sales and time data, but also one or more of a geographic location or data concerning a source, manufacturer, buyer, seller, shipper, contract terms, warranty terms, description, material, size, color, packaging, part number, stock keeping unit (SKU), or any data or metadata commonly used in the art.

In an embodiment, the product demand data set may be transformed using one of the described imputation or substitution methods before or after being loaded into memory as seen in block 204. In other embodiments, the product demand data may be cleaned or deduplicated before or after being loaded into memory as seen in block 204. In other embodiments, the product demand data may be processed in other ways before or after being loaded into memory as seen in block 204 such as by removing outliers from the product demand data, cleaning the product demand data, removing unreadable data, or correcting errors in the data. In an embodiment, the data processing at block 204 or other data processing illustrated in FIG. 2 is actuated by data processing logic 106 as illustrated in FIG. 1.

In an embodiment, the product demand data is formatted for processing at block 208. Formatting product demand data for processing may comprise transforming the data into a convenient format to be used as input in a machine learning model or statistical model. Data transformations effectuated at block 208 may comprise (1) resizing inputs to a particular fixed size (2) converting non-numeric data features into numeric features ones, (3) normalizing numeric data features, (4) lower-casing or tokenizing metadata text features, or (5) other data transformations used to process data prior to machine learning or statistical analysis.

In an embodiment, distributed computer system 100 is programmed to receive user input to select a data source for the product demand data. The user input may be visual or graphical, in the form of selection of graphical user interface widgets. In an embodiment, block 202 illustrates examples of data sources that may be selected.

In an embodiment, in response to a selection, a data set from the specified source 202 is written into memory, as seen in block 204. In an embodiment, the memory referenced in block 204 is the main memory of a virtual machine instance of a cloud computing center that implements elements of a computer system for networked access using client computers or workstations. For example, the computer system may be implemented using a dynamic plurality of virtual machine instances that client computers of end users access using Software as a Service (SaaS) techniques and correspond to distributed computer system 100 (FIG. 1). In another embodiment, the memory block referenced in block 204 is a block of memory in the memory 606 of the physical computing device illustrated in FIG. 6.

In an embodiment, once data is in memory at block 204, a disruption-resistant demand prediction workflow may begin at step 310 (FIG. 3) where a training data set is received for analysis. In an embodiment, the training data set comprises the entire data set loaded into memory at block 204. In another embodiment, the training data set comprises a subset of the data set loaded into memory at block 204. In an embodiment, the subset of the data set is selected by user input. In an embodiment, the subset of the data set is selected so that the remaining data in the data set may be used for testing, evaluation, or validation of modeling results. In an embodiment, the subset of the data set may be selected at least partially based on any of the various data or metadata associated with the product demand data, including but not limited to information about geographic location, source, manufacturer, buyer, seller, shipper, contract terms, warranty terms, description, material, size, color, packaging, part number, or SKU. In an embodiment, the data is not partitioned at block 204, but is instead partitioned at block 210.

In an embodiment, product demand data comprising a training data set is stored in database 220 after it is cleaned, transformed, processed, or formatted.

2.3 Disruption-Resistant Demand Prediction Overview

Figure 3:
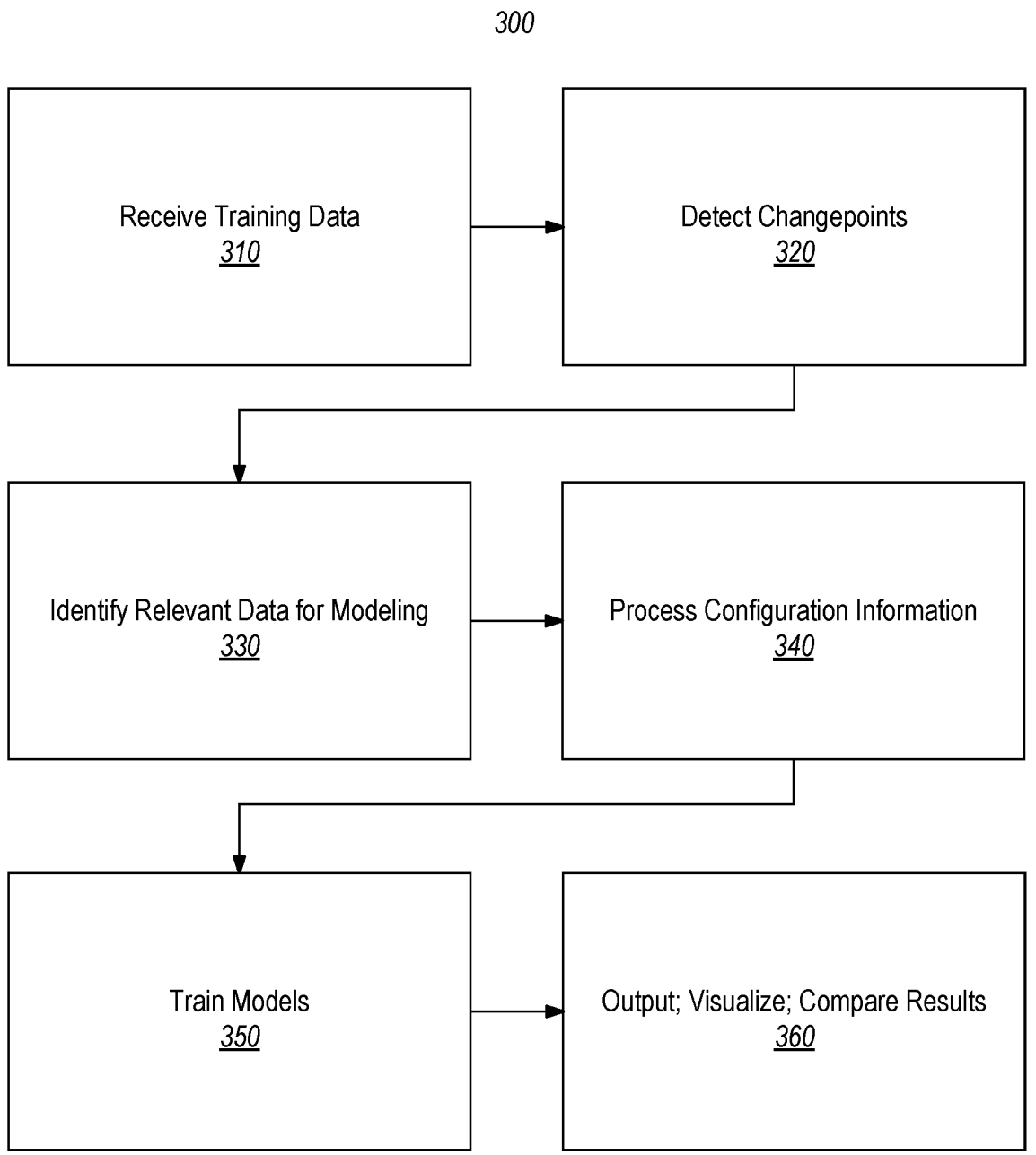
FIG. 3 illustrates an example process for disruption-resistant demand forecasting.

FIG. 3 illustrates a flow diagram overview of a computer-implemented method for processing a training data set for product demand forecasting.

In an embodiment, at step 310, a computer system receives a training data set. In an embodiment, the training data set may have been prepared and loaded into memory as explained in Section 2.2 of this disclosure. In an embodiment, the training data set may comprise product demand data as explained in Section 2.2 of this disclosure. In other embodiments, the computer system receives product demand data according to other specifications. In embodiments, the training data set may comprise any kind of time series data set. In an embodiment, the method illustrated in FIG. 3. may be implemented on the distributed computer system illustrated in FIG. 1 and the coordination of processes required for disruption-resistant demand prediction may be controlled by project management logic 104. In an embodiment, the method illustrated in FIG. 3. may be implemented on computer system 600 illustrated in FIG. 6. In other embodiments, the method illustrated in FIG. 3 may be implemented by another type of system.

At step 320 of FIG. 3, in an embodiment, a distributed computer system 100 calculates any breakpoints in the training data set. Breakpoints may correspond to the occurrence of real-life disruptive events that cause sudden level or trend changes in historical product demand data. These disruptive events may be epidemics like COVID-19, other disease outbreaks, other events that cause increased portions of a population to stay at home or restrict movement, or a variety of other disruptive events. Breakpoints may correspond to a shift from one type of behavior in a consumer populace, such as panic, buying, stabilization, or normalcy to another such phase of behavior in a consumer populace. Breakpoints may correspond directly with disruptive events, or they may be time-lagged. Breakpoints may occur as a result of responses to a disruptive event, including governmental responses. Governmental responses may comprise financial responses such as changes to fiscal or monetary responses or legal responses such as restrictions, regulation, or curfews. Breakpoints may also be known in the art of predictive modeling or other arts as changepoints.

At step 320, in an embodiment, a distributed computer system 100 calculates zero or more changepoints in the training data set by executing a changepoint detection algorithm. In an embodiment, changepoints may be detected within the entire training data. In other embodiments, the training data set may be federated, or hierarchical and changepoints may be detected within subsets of the training data set. Changepoints may be detected in subsets corresponding to any of the various data or metadata associated with product demand data, including but not limited to information about geographic location, source, manufacturer, buyer, seller, shipper, contract terms, warranty terms, description, material, size, color, packaging, part number, or SKU. In some embodiments, the training data set may comprise time series data that can be clustered to identify and group time series (e.g., products and locations) that are experiencing similar shifts in demand patterns. In those embodiments, distributed computer system 100 may be programmed to cluster the training data set, and then execute a changepoint detection algorithm to detect changepoints in a plurality of representative time series corresponding to a plurality of clusters. In an embodiment, a distributed computer system 100 receives input from a user which specifies whether to cluster the training data set and calculate changepoints in representative time series corresponding to detected clusters using a changepoint detection algorithm. Such clustering may save time and computing resources when the training data set contains time series data for a large number of products, in some instances for thousands or millions of products.

At step 320 of FIG. 3, in an embodiment, a computer system calculates changepoints using machine learning methods. Machine learning methods used for changepoint detection may be supervised or unsupervised. Supervised methods comprise methods that may use (1) multi class classifiers, such as decision tree, nearest neighbor, support vector machine (SVM), naïve Bayes, Bayesian net, hidden Markov model (HMM), conditional random field (CRF), Gaussian mixture model (GMM) methods, (2) binary class classifiers, such as support vector machine (SVM), naïve Bayes, or logistic regression methods, or (3) virtual classifiers. Unsupervised methods may use a likelihood ratio, a subspace model, probabilistic methods, kernel-based methods, graph-based methods, or clustering. Changepoint detection may be aided by an indicator akin to a moving average convergence/divergence (MACD) indicator.

At step 330 of FIG. 3, in an embodiment, a distributed computer system 100 identifies relevant data for modeling. The entire training data set may be modeled, or a subset of the training data set may be modeled. In an embodiment, step 330 comprises distributed computer system 100 calculating or retrieving a baseline forecast for one or more products to determine if any of those products are currently being, or will be in the future, impacted by a disruptive event. In an embodiment, a baseline forecast is retrieved which was calculated at a time prior to a time value detected to be a changepoint in one or more products at step 320. In an embodiment, demand statistics comprising mean demand level, median demand level, standard deviation of demand level, or other major demand statistics are calculated for selected periods before and after a detected changepoint in time series data for one or more products or clusters. In an embodiment, if there is a large deviance in major demand statistics before or after a changepoint in a product time series, then distributed computer system 100 may be programmed to flag that time series as significantly impacted by a disruptive event. A large deviation, for example, of demand statistics or a forecast error prior to and after the disruptive event may be quantified as a deviation exceeding 1.5*Inter Quartile Range (IQR), above and below the 75th and 25th percentiles of the historical data. One of ordinary skill in the art will recognize that other metrics may be employed to quantify a significant forecast error or deviation for flagging. In embodiments where distributed computer system 100 clusters time series at step 320, distributed computer system 100 may determine which representative time series of one or more clusters should be flagged as significantly impacted by the disruptive event using a discussed method.

At step 340 of FIG. 3, in an embodiment, a distributed computer system 100 processes configuration information which partially determines one or more of (1) which data to model, (2) which of one or more types of models to use, (3) which third-party data, if any, to feed into the one or models, (4) how those one or more models are to be initialized, configured, or run, and (5) other configuration information. Configuration information may comprise a cross-learning preference, a preference for accuracy or control, input narrowing specifications comprising a selection of a specific product, region, or cluster to model, a dampening factor, a future inflection point prediction, a third-party data selection, or a short-term-forecasting preference. In an embodiment, one or more pieces of configuration information is received as input from a user. In other embodiments, all configuration information is hard-coded into memory accessible by distributed computer system 100.

At step 350 of FIG. 3, in an embodiment, a distributed computer system 100 executes instructions to create one or more models to predict future product demand data based on the training data set. In an embodiment, one or more models are run based on the configuration information processed at step 340.

At step 350, in an embodiment, third-party data may be used to improve the predictive power of one or more models. For example, when dealing with a disruptive event such as a disease outbreak, like the COVID-19 epidemic, external metrics around restrictions on societal activities or compliance may provide insight on future product demand. Examples of such third-party data include, but are not limited to, mobility data from technology companies that provide maps, GPS tracking, or navigational directions as a service. Such data may capture the impact of local restrictions and how much compliance is observed in various localities, for example, by tracking a percent change in visits to places like grocery stores and parks within a geographic area. Location-based mobility metrics for one or more calendar days may be compared to a baseline value for that day in the immediately preceding calendar year. In another example, third-party projections of effects derived from a disruptive event, such as predicted death rate curves for an outbreak like COVID-19 may be correlated with future product demand. Other indicators impacting demand may include a social distance index, case counts, school closures data, unemployment claims data, consumer sentiment, hospital utilization data, or other indicators. In embodiments, one or more of these third-party projections or indicators provide additional data sources with which one or more models may be trained. In an embodiment, third-party data is selected for processing in response to user input. In an embodiment, third party data is selected for processing based on the configuration instructions processed at step 340.

At step 350, in an embodiment, data engineering may be used to process related regressors such as external metrics, location-based mobility data, third-party projections, or other indicators impacting demand before they are used to train models. Data engineering may be usefully employed because many related regressors may not be forward-looking, meaning they are not available at prediction time and cannot be used directly to train models. In embodiments, step 350 may comprise generating lags (lead indicators) and window statistics with a starting point limited by the forecast horizon. Next, correlation analysis may be performed on lagged regressors to determine optimal lags. In other embodiments, step 350 may comprise using forecasted regressors, which may have high accuracy validation metrics, at prediction time.

At step 350, in an embodiment one or more machine learning models are trained and executed after third-party data has been engineered for processing. Training may comprise programmatically supplying a training dataset to a machine learning model that is executing in the computer system and programmatically activating a training function of the model with a reference to or identification of the training dataset to be used. In an embodiment, third-party data may be cleaned, deduplicated, or otherwise modified before it is used for training models. In other embodiments, third-party data is used without being engineered or modified. In other embodiments, one or more models are trained and executed without the use of third-party data. Various models may be trained or executed at step 350, including, but not limited to, Classical Models (e.g., Statistical Models or State Space Models) or Machine Learning & AI based Models (e.g., Machine Learning Models or Neural Networks). Statistical Models comprise autoregressive (AR) models, moving average (MA) models, autoregressive integrated moving average (ARIMA) models, vector autoregression (VAR) models, hierarchical models, or others. State Space Models comprise exponential smoothing (ETS) models, Hidden Markov models, Bayesian structural time-series models, or others. Machine Learning models comprise support vector machines (SVMs), tree-based models, kNN's, or others. Neural Networks comprise temporal convolutional neural (TCN) networks, multi-layer perceptron networks (FF neural networks), recurrent neural networks (e.g., long short-term memory (LSTM) or gated recurrent units (GRUs)), convolutional neural networks (CNN), or others. In an embodiment, one or more models executed at step 350 comprise lift-adjusted seasonal naïve models, quantile regression models, stockout prediction models.

At step 350, in an embodiment, a distributed computer system 100 only executes new models for those time series flagged as significantly impacted by the disruptive event at step 330.

Different geographic regions may be in different phases of the lifecycle of a disruptive event such as a disease outbreak (e.g., COVID-19). As some cities, state, or countries may be further along an epidemic curve, lagged features may be used to predict patterns in other cities, states, or countries respectively. At step 350, in an embodiment, to determine lag between cities/states/countries, changepoint detection may be implemented for similar (e.g., clustered) products. Calculated lag may represent time required to change phase, enabling a distributed computer system 100 to compute the expected point in time where changes should be expected. The aforementioned process may be understood as using predicted changepoint detection and assigning binary regressors in the forecasting period. One or more models executed at step 350 may be modified with this technique to potentially improve forecasting accuracy.

For certain disruptive events such as viral outbreaks (e.g., COVID-19) causals may not be applicable at a SKU level, but rather at higher levels of the hierarchy. Furthermore, when modeling aggregated data, noise is removed, and substitution effects are minimized. Thus, it may be more effective to model at higher levels of the product or location hierarchy to better capture level shifts. Once such shifts are detected, they may be propagated to lower levels of a hierarchy via Hierarchical Time Series (HTS) forecasting or in post-processing. At step 350, in an embodiment, one or more models executed may employ HTS forecasting. HTS forecasting may be implemented using a bottom-up approach, a top-down approach, a middle-out approach, or an optimal reconciliation approach. HTS forecasting may be most useful when product demand data is highly federated and the type of HTS approach may be determined by the level of hierarchy in the product demand data. Such approaches may increase coherency in model output.

At step 350 of FIG. 3, in an embodiment, a distributed computer system 100 executes instructions to create one or more models to predict future product demand data based on the training data set. In an embodiment, one or more models are run based on the configuration information processed at step 340.

At step 350 of FIG. 3, in an embodiment, a distributed computer system 100 executes "back testing," or time series validation, to assess the forecasting accuracy of one or more models. Back testing may be preferable to simpler cross-validation methodologies sometimes used in machine learning model validation. For example, simple random splitting of samples into train and test sets might introduce data leakage in the time series context where there is a temporal dependency between observations. In an embodiment, validating one or more models comprises executing "walk-forward cross-validation." In other embodiments, other validation techniques may be used which may incorporate folds sizes and gaps between the sets. Back testing may be used for a Hyperparameter Tuning Set, an Ensemble Set, an Estimator Selection Set, or an Unbiased Test Set, independently and sequentially.

At step 360 of FIG. 3, in an embodiment, a distributed computer system 100 outputs the results of the models run at step 350, including to, for example, user display device 140 (FIG. 1). In an embodiment, modeling results are output in a visualization pane of a graphical user interface (GUI). Modeling results may be output in the form of graphs, tables, charts, or other forms. Modeling results may be written to a file, such as a CSV, Excel, or txt file, or to another type of file. Modeling results may be stored in a database or transmitted as output to be input for another system.

Figure 5A:
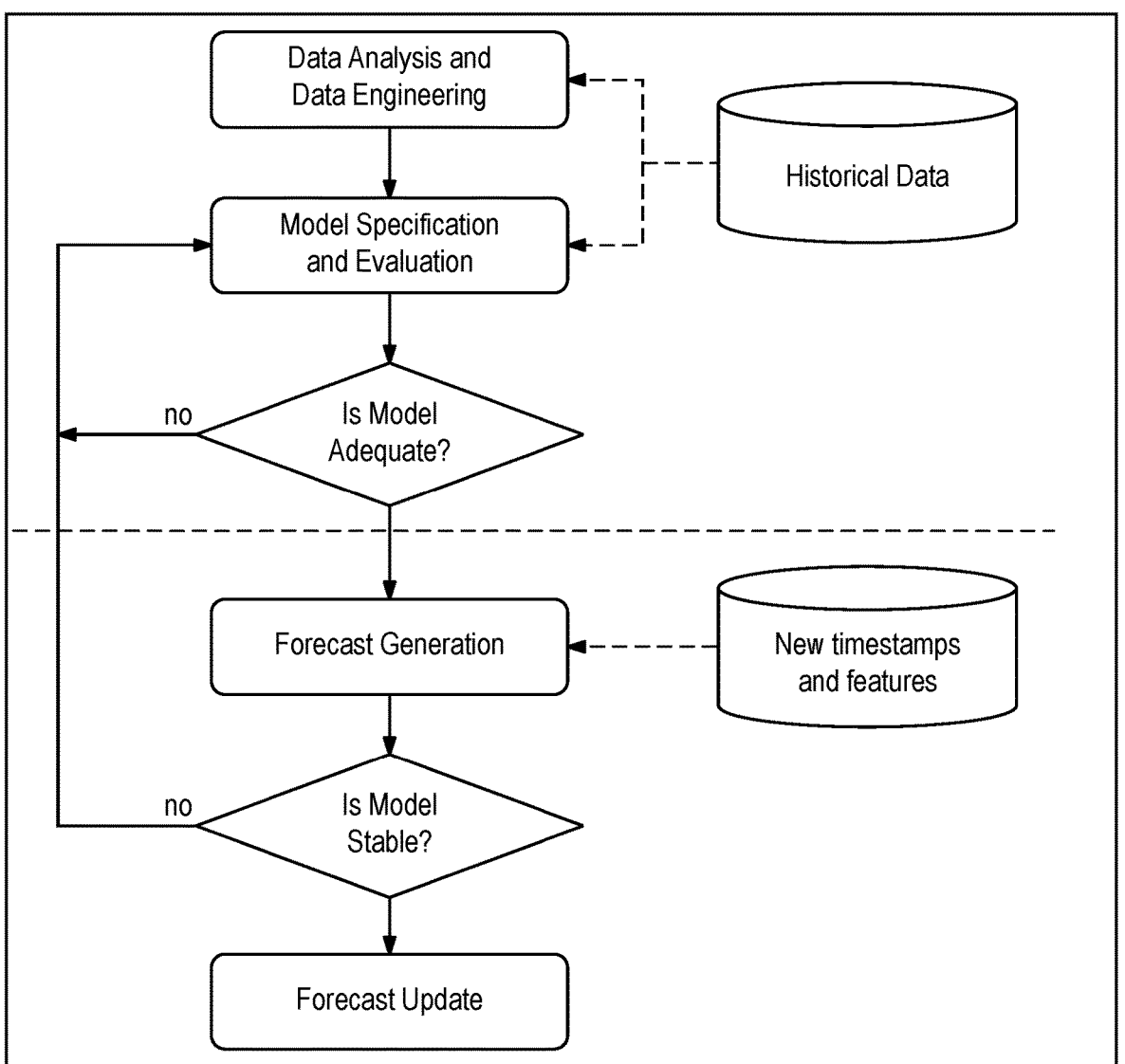
FIG. 5A, FIG. 5B, and FIG. 5C illustrate examples of generalized processes for forming forecasting models and using the forecasting models in a production computing environment that may be used to implement certain embodiments.
Figure 5B:
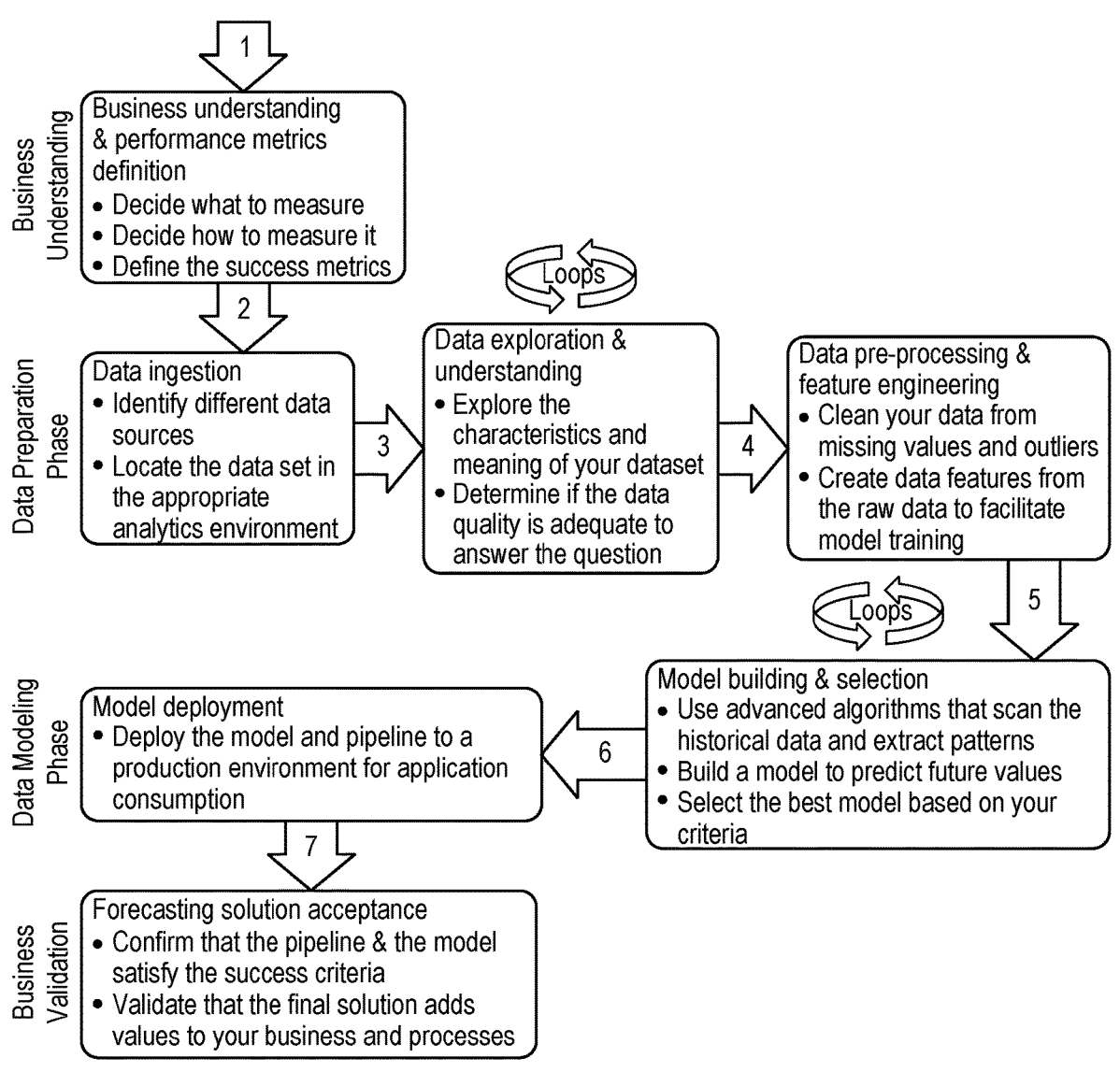
Figure 5C:
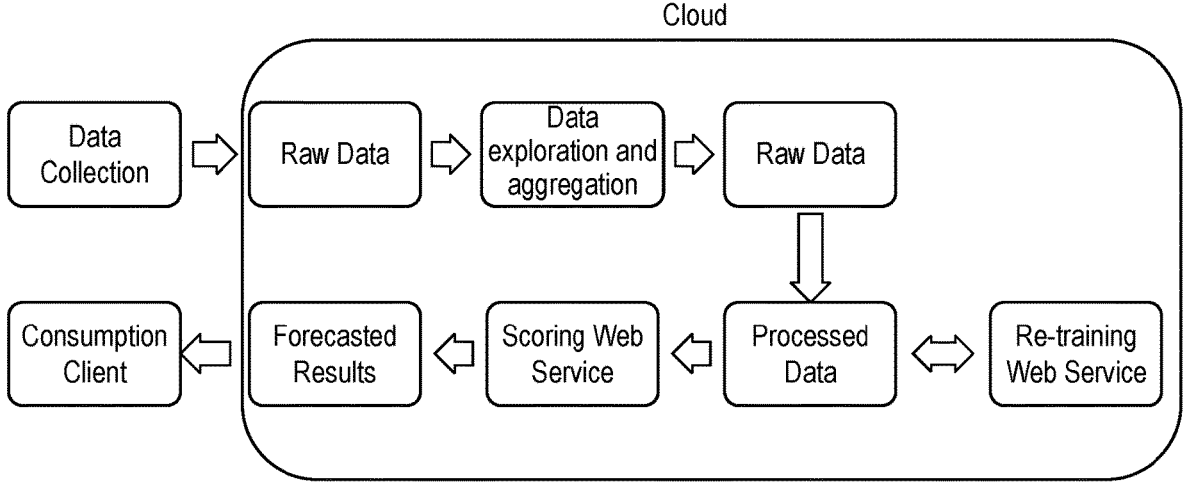

FIG. 5A, FIG. 5B, FIG. 5C illustrate examples of generalized processes for forming forecasting models and using the forecasting models in a production computing environment that may be used to implement certain embodiments.

Referring first to FIG. 5A, in an embodiment, development and deployment of forecasting models involves a two-stage approach. A first stage, termed a Model Building stage, is part of the development process which comprises an analysis of the data and the evaluation of forecasting models. Model Building begins with a data analysis and data engineering step in which historical datasets are assessed for the presence of features useful in forecasting, missing fields are identified for interpolation or enrichment from other data sources, and normalization is conducted to adjust the format of otherwise incompatible data fields. A Model Specification and Evaluation step follows in which a forecasting model is selected or specified in mathematical terms, implemented in program code, and executed to evaluate or process the historical data to product output in the form of forecasting results. The model is deemed adequate if the output forecast is found usable. If not, the model may be re-specified by adjusting mathematical terms or changing input data features, and re-evaluated.

When the model is adequate, control transfers to an Operationalization stage. The Operationalization stage performs forecasting in a production environment. In an embodiment, the model that was validated in the prior stage is instantiated in one or more executable instances, for example, using computing instances of a cloud computing center. These instances are executed to generate forecasts that support the decision-making process, normally using newly created data having new timestamps and possibly new features. As forecast output is produced, the output is evaluated to check stability and continued validity. Over time, model drift or degradation is expected to occur, which requires retraining of the selected models, so control may transfer back to the model specification and evaluation stage. If the model is in a stable state, then a forecast update may be output based on the evaluation of the new time-stamps and features and used for decision-making.

FIG. 5B illustrates an embodiment of the Model Building stage of FIG. 5A in greater detail. In an embodiment, the Model Building stage begins with a Business Understanding step comprising identifying one or more relevant metrics for forecasting, determining how to measure the metrics, and determining how to measure successful forecasting via one or more success metrics.

The Model Building stage then continues, in an embodiment, with a Data Preparation Phase. In an embodiment, the Data Preparation Phase comprises a data ingestion step that involves identifying one or more different data sources, locating datasets in one or more data analytics environments, and reading one or more files containing the datasets. Relational database tables, spreadsheets, flat files, or other sources may be read. In an embodiment, the data ingestion step is followed by a data exploration & understanding step that involves exploring the characteristics and meaning of a dataset and determining if the data quality is adequate to answer one or more questions about the data. These steps may be looped through or iteratively repeated until data quality is sufficient. In an embodiment, once data quality is sufficient, a final step in the Data Preparation Phase comprises a data pre-processing & feature engineering step that involves cleaning missing values and outliers from the data and creating data features from the raw data to facilitate model training.

The Model Building stage then continues, in an embodiment, with a Data Modeling Phase. In an embodiment, the Data Modeling Phase comprises a model building & selection step that involves using algorithms to scan historical data and extract patterns, building one or more models to predict future values, and selecting one or more best models based on project criteria. These steps may be looped through or iteratively repeated to build new models as more historical data is ingested or project criteria changes. In an embodiment, the model building and selection step is followed by a model deployment step that involves deploying one or more models and data pipelines to a production environment for application consumption.

The Model Building stage then concludes, in an embodiment, with a Business Validation step that involves forecasting solution acceptance. In an embodiment, forecasting solution acceptance comprises confirming that the one or more pipelines and the one or more models satisfy success criteria and validating that a final solution adds value to a business and its processes.

FIG. 5C illustrates an embodiment of the Operationalization stage of FIG. 5A in greater detail. In an embodiment, data collection continues, and raw data is fed into a cloud-based system for generating forecasts in a production environment. In an embodiment, once new raw data is ingested into the cloud-based system, the Operationalization stage continues with supplemental data exploration and aggregation, wherein the aggregated data may be explored to assess the characteristics of the aggregated data set and reevaluate data quality. In an embodiment, the data exploration and aggregation step is followed by a feature engineering step in the Operationalization stage. Feature engineering may include cleaning missing values and outliers from the data and creating data features from the data to facilitate model training.

In an embodiment, the Operationalization stage of FIG. 5A involves feeding processed data which is the resulting output of feature engineering into a Re-training Web Service or a Scoring Web Service. A Re-training Web Service retrains one or more machine learning or statistical models previously described and may comprise a web service instance of a cloud computing system denoted "Re-training Web Service." A Scoring Web Service executes forecast models or processes previously described and may comprise a web service instance of a cloud computing system denoted "Scoring Web Service." In an embodiment, as new forecast output is produced in the production environment, the output is reevaluated to check stability and continued validity. If the model is in a stable state, then a forecast update may be output based on evaluation of new timestamps and features and used for decision-making.

In an embodiment, the Operationalization stage of FIG. 5A involves transmitting forecasted results from the cloud-based system to a Consumption Client, which may be any client configured to receive, or consume, the output of one or more models executed in the production environment. The Consumption Client may be a server accessible via an API call, a relational database or other file system, or any application layer configured to receive forecasted results as input.

2.4 IDENTIFYING RELEVANT DATA & CLUSTERING

At step 330 of FIG. 3, in an embodiment, a computer system identifies relevant data for modeling. As explained in greater detail in Section 2.3 of this disclosure, one way that relevant data may be identified for modeling is: (1) by calculating a baseline forecast, (2) by calculating relevant demand statistics or forecast errors for a period of time before or after a changepoint, and (3) by identifying data corresponding to segments of time series after changepoints with high forecast error as data which is particularly relevant for modeling. Another helpful technique which may be used to identify relevant data for modeling is clustering.

At step 330 of FIG. 3, in an embodiment, clustering may provide insights into product velocity and demand as a disruptive event takes firm hold in a region. Clustering may be used to identify and group time series (e.g. items and locations) that are experiencing similar shifts in demand patterns. Since impact from a disruptive event may change rapidly over time, it may be advantageous to condense the amount of information that needs to be processed, while providing detailed information on the types of patterns that are unfolding across an entire portfolio of products. By clustering and focusing on a representative time series for each pattern of demand unraveling within each clustering, groups of products in the product portfolio exhibiting signs of normal behavior may be identified. Likewise, groups of products deviating away from normalcy may be identified. In an embodiment, data for one or more product clusters identified as deviating from normalcy may be then be used for modeling at step 350. The described process may allow for scaling to millions of products quickly and at lower computational cost.

At step 330, in an embodiment, a K-Means clustering approach may be used to scale the clustering process to millions of time series. The K-Means clustering approach may comprise using a demand pattern observed over a window of time since the onset of the disruption as provided features. These features (demand over a window) may be normalized and smoothed to ensure some randomness from day to-day fluctuations does not have a large impact on the clustering process. The normalization may be interpreted as the number of folds in the average historical demand at a certain period (wherein values>1 indicate increased demand, and values<1 indicate less demand).

Figure 4:
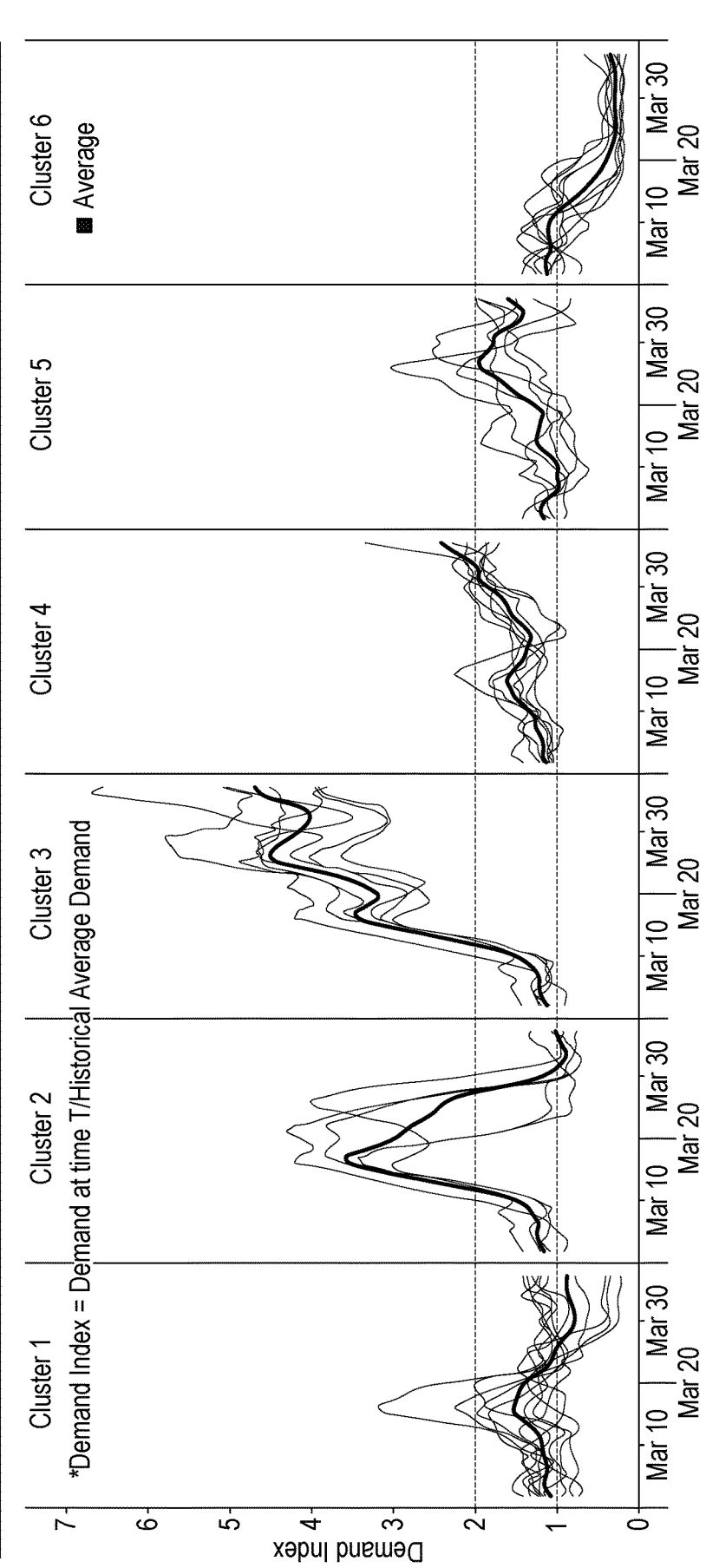
FIG. 4 illustrates an example of time series cluster visualization.

FIG. 4 shows example output from a clustering, where, for each cluster, the features (normalized time series over a recent horizon) are plotted against the time periods. In FIG. 4, Clusters 3 and 4 may be deemed clusters where the demand has been showing an increasing trend without any indication of a return to normalcy. Cluster 3 may be distinguished from Cluster 4 by a level of increase in demand. Demand in Cluster 3 appears to grow unabated, experiencing up to five times the normal volume of demand. Cluster 3 may represent, for example, products such as toilet paper, hand sanitizers, and other disinfectants during the early stages of the COVID-19 epidemic. On the other hand, demand in Cluster 4 appears to rise to two times historical values.

FIG. 4 shows Clusters 1, 2, and 6 as groups products that have experienced a growth in demand followed by signs of returning to normalcy or settling at a new normal. However, what distinguishes each one of these clusters is the degree of the growth, rate of the growth, and the demand level the clusters appear to stabilize at. Clusters 1 and 6 appear to have experienced a gradual increase in demand, while demand in Cluster 1 appeared to stop growing, and began returning to normalcy. Demand for products in Cluster 6 appeared to continue to grow before settling at a new normal. Finally, Cluster 6 appears to group together products that experienced a negative effect on demand due to COVID-19, wherein demand stayed flat for some time, and then, as the severity of the disease progressed, evidenced a steep decline in demand before settling at a new normal (e.g., products such as camping equipment).

2.5 Configuration Instructions & Flexibility

At step 340 of FIG. 3, in an embodiment, a computer system processes configuration information which partially determines one or more of (1) which data to model, (2) which of one or more types of models to use, (3) which third-party data, if any, to feed into the one or models, (4) how those one or more models are to be initialized, configured, or run, and (5) other configuration information.

At step 340, in an embodiment, a computer system processes configuration information comprising data which indicates a preference for accuracy or for control. In an embodiment, if the data indicates a preference for accuracy, then one or more of an LSTM or another Neural Network type model, or a Bayesian structural time series model is subsequently executed at step 350. In an embodiment, if the data indicates a preference for control, then one or both of an ETS or lift-adjusted seasonal naïve model is subsequently run at step 350.

In an embodiment, configuration information processed at step 340 may also indicate that a high-demand scenario is present. In an embodiment, one or both of quantile regression and a stockout prediction model are executed at step 350 when configuration information processed at step 340 indicates a high-demand scenario. Quantile regression may be used to forecast ranges of high-demand estimates to help meet acceptable service levels. Quantile regression forecasting involves modeling an entire demand distribution; and, it may be particularly effective when costs associated with over-forecasting and under-forecasting are unequal. Stockout prediction models may help determine the probability of a stockout over a given timeframe. This model may effectively identify items with a high likelihood of running out of stock and can be implemented as a classification algorithm with the target variable as either a stock-out indicator (1 or 0) or an inventory level range (e.g., low/medium/high). Rate-of-consumption metrics, inventory levels, and demand forecasts may serve as inputs to a stockout prediction model. In some embodiments, one or both of a quantile regression or stockout prediction model may be executed at step 350 even when a high-demand scenario is not indicated or present.

In an embodiment, configuration information processed at step 340 may comprise data indicating a cross-learning preference. Cross-learning, a characteristic of global methods, may be used by a variety of models to learn patterns between similar time series, particularly when a large number of time series are being dealt with. In an embodiment, cross-learning is implemented in one or more models executed at step 350 when configuration information processed at step 340 indicates a cross-learning preference. In other embodiments, cross-learning may be implemented in one or more models executed at step 350 even when configuration information does not indicate a cross-learning preference.

In an embodiment, configuration information processed at step 340 may comprise data indicating a short-term-forecasting preference. In an embodiment, more recent product demand data is weighted more heavily in one or more models executed at step 350 when configuration information processed at step 340 indicates a short-term-forecasting preference. In other embodiments, data weighting may be implemented in one or more models executed at step 350 even when configuration information does not indicate a short-term-forecasting preference.

In an embodiment, configuration information processed at step 340 may comprise data indicating a third-party data selection. In an embodiment, third party data is incorporated in training one or more models executed at step 350 when configuration information processed at step 340 indicates a third-party data selection.

In an embodiment, configuration information processed at step 340 may comprise data indicating a dampening factor. Notwithstanding seasonality and noise, most SKU's may be associated with a generally increasing trend which may be evident in a previously calculated or received baseline model. A dampening factor reduces the changes presented by a new model in comparison to a baseline model calculated before a disruptive event. A dampening factor may be thought of as a "Social Restrictions Lever" with regards to the COVID-19 epidemic. A higher dampening factor may model a prediction of fewer social restrictions and a tendency for consumer demand to emulate a baseline forecast more closely than newly predicted. In an embodiment, a dampening factor is incorporated in executing one or more models at step 350 when configuration information processed at step 340 indicates a dampening factor.

In an embodiment, configuration information processed at step 340 may comprise data indicating a future inflection point prediction. Data about a disruptive event (such as third-party projections concerning COVID-19 death rates) may indicate a future changepoint is likely. In such cases, a future changepoint may be implemented in executing one or more models at step 350 via a regressor or structural break. The future change point indicates a likelihood of, for example, an inflection point, a change in level, or a change in trend for product demand. In an embodiment, a future inflection point prediction may comprise data indicating that models executed at 350 should be adjusted to reflect a "Return to Normalcy" by a certain "Recovery Date" and that demand predictions should revert to a new baseline prediction after that date. The "Recovery Date", may be, for example, when a death rate from an epidemic (e.g., COVID-19) is expected to fall below 6 deaths per day or 10% of a peak death rate for one day in a location, or another date when normalcy is predicted to return. In an embodiment, a future inflection point prediction is incorporated in executing one or more models at step 350 when configuration information processed at step 340 indicates a future inflection point prediction.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
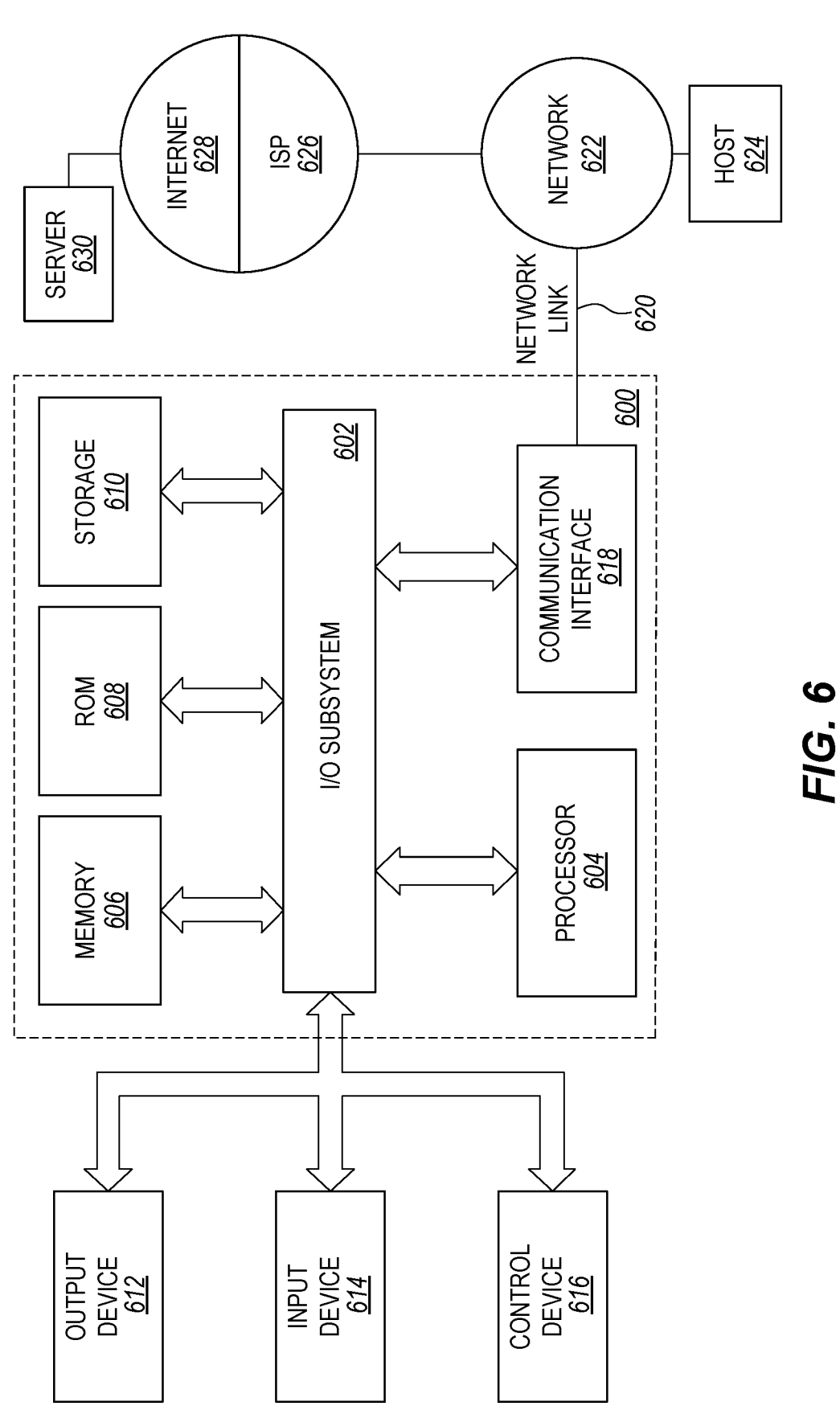
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory

606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display device 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server computer 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server computer 630 broadly represents any computer, data center, virtual machine, or virtual computing instance with or without a hypervisor, or computer executing a containerized program system such as DOCKER or KUBERNETES. Server computer 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server computer 630 may form elements of a distributed computing system that includes other computers, a processing cluster, server farm or other organization of computers that cooperate to perform tasks or execute applications or services. Server computer 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server computer 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of forecasting supply chain demand of products of goods or services, executed by a distributed computer system comprising data acquisition logic, project management logic, data storage logic managing a database storing product demand data, third-party data, training data, testing data, and output data, and data processing logic that exposes a retraining web service and a scoring web service deployed in a cloud production environment, the method comprising:

receiving, by the data acquisition logic, a training data set comprising product demand data indicating consumer demand for millions of products at a plurality of time points;

when downstream consumption data is unavailable, and only upstream demand signals are present, estimating true demand by imputing sales using a substitution-split imputation that allocates incremental demand across substitute SKUs proportionally to historical shares and/or by using a site-visit-to-sales ratio for primarily online items;

clustering the training data set into a plurality of time series clusters using K-means over normalized and smoothed demand-index windows since disruption onset to obtain cluster representatives;

executing, by the data processing logic, a supervised multi-class machine learning classifier aided by moving average convergence/divergence (MACD) indicators to output calculations of one or more changepoints representative time series for the clusters, each of the changepoints corresponding to a disruptive event;

retrieving a baseline forecast for one or more of the products calculated prior to a detected changepoint and calculating one or more of a mean demand level, a median demand level, or a standard deviation of demand level for selected periods of the training data set that are before and after the detected changepoint;

identifying a deviation between the baseline forecast and a particular time series cluster among the plurality of the time series clusters before and after the detected changepoint corresponding to a disruptive event, the deviation exceeding, 1.5*Inter Quartile Range (IQR) above the 75th percentile or below the 25th percentile of the baseline forecast, and in response, flagging the particular time series cluster as impacted by a disruptive event;

processing configuration information that specifies third-party data for training one or more machine learning models and, in response thereto, accessing one or more of mobility tracking data specifying a percent change in visits to stores within a geographic area, a social distance index, school closures data, case count data, unemployment claims data, consumer sentiment data, or hospital utilization data;

engineering non-forward-looking regressors by generating lagged lead indicators and window statistics with a starting point limited by a forecast horizon, and selecting optimal lags by correlation analysis on the lagged regressors;

transforming the training data set and the third-party data to be used for training the one or more machine learning models into a format suitable for the one or more machine learning models by one or more of: resizing inputs to a particular fixed size, converting non-numeric data features into numeric feature ones, normalizing numeric data features, or lower-casing or tokenizing metadata text features;

training new machine learning models only for the time series clusters flagged as impacted, based on the training data set and the third-party data, and validating the trained models using walk-forward cross-validation to prevent time-dependent data leakage;

applying hierarchical time-series reconciliation to propagate detected level shifts coherently between aggregated and disaggregated levels across a product and/or location hierarchy;

inputting one or more new timestamps respectively associated with one or more products; and executing the scoring web service to generate forecasts for the new timestamps, transmitting forecasted results to a consumption client via an API, and rendering forecast visualizations on a user display device, and executing the retraining web service to retrain models for flagged series or clusters.

2. The computer-implemented method of claim 1, wherein at least a portion of the product demand data comprising upstream consumption data that corresponds to one or more other computing systems that are upstream from the distributed computer system; the method further comprising updating the product demand data for the one or more products by imputing sales values based on the upstream consumption data.

3. The computer-implemented method of claim 1, further comprising clustering the training data set into a plurality of time series clusters based on the MACD indicators that are associated with the product demand data.

4. One or more non-transitory computer-readable storage media storing one or more sequences of instructions which, when executed using one or more processors of a distributed computer system comprising data acquisition logic, project management logic, data storage logic managing a database storing product demand data, third-party data, training data, testing data, and output data, and data processing logic that exposes a retraining web service and a scoring web service deployed in a cloud production environment, cause the one or more processors to execute:

receiving, by the data acquisition logic, a training data set comprising product demand data indicating consumer demand for millions of products at a plurality of time points;

when downstream consumption data is unavailable, and only upstream demand signals are present, estimating true demand by imputing sales using a substitution-split imputation that allocates incremental demand across substitute SKUs proportionally to historical shares and/or by using a site-visit-to-sales ratio for primarily online items;

clustering the training data set into a plurality of time series clusters using K-means over normalized and smoothed demand-index windows since disruption onset to obtain cluster representatives;

executing a supervised multi-class machine learning classifier aided by moving average convergence/divergence (MACD) indicators to output calculations of one or more changepoints representative time series for the clusters, each of the changepoints corresponding to a disruptive event;

retrieving a baseline forecast for one or more of the products calculated prior to a detected changepoint and calculating one or more of a mean demand level, a median demand level, or a standard deviation of demand level for selected periods of the training data set that are before and after the detected changepoint;

identifying a deviation between the baseline forecast and a particular time series cluster among the plurality of the time series clusters before and after the detected changepoint corresponding to a disruptive event, the deviation exceeding, 1.5*Inter Quartile Range (IQR) above the 75th percentile or below the 25th percentile of the baseline forecast, and in response, flagging the particular time series cluster as impacted by a disruptive event;

processing configuration information that specifies third-party data for training one or more machine learning models and, in response thereto, accessing one or more of mobility tracking data specifying a percent change in visits to stores within a geographic area, a social distance index, school closures data, case count data, unemployment claims data, consumer sentiment data, or hospital utilization data;

engineering non-forward-looking regressors by generating lagged lead indicators and window statistics with a starting point limited by a forecast horizon, and selecting optimal lags by correlation analysis on the lagged regressors;

transforming the training data set and the third-party data to be used for training the one or more machine learning models into a format suitable for the one or more machine learning models by one or more of: resizing inputs to a particular fixed size, converting non-numeric data features into numeric feature ones, normalizing numeric data features, or lower-casing or tokenizing metadata text features;

training new machine learning models only for the time series clusters flagged as impacted, based on the training data set and the third-party data, and validating the trained models using walk-forward cross-validation to prevent time-dependent data leakage;

applying hierarchical time-series reconciliation to propagate detected level shifts coherently between aggregated and disaggregated levels across a product and/or location hierarchy;

inputting one or more new timestamps respectively associated with one or more products; and executing the scoring web service to generate forecasts for the new timestamps, transmitting forecasted results to a consumption client via an API, and rendering forecast visualizations on a user display device, and executing the retraining web service to retrain models for flagged series or clusters.

5. The one or more non-transitory computer-readable storage media of claim 4, wherein at least a portion of the product demand data comprising upstream consumption data that corresponds to one or more other computing systems that are upstream from the distributed computer system; further comprising one or more sequences of instructions which, when executed using the one or more processors, cause the one or more processors to execute: updating the product demand data for the one or more products by imputing sales values based on the upstream consumption data.

6. The one or more non-transitory computer-readable storage media of claim 4, further comprising one or more sequences of instructions which, when executed using the one or more processors, cause the one or more processors to execute: clustering the training data set into a plurality of time series clusters based on the MACD indicators that are associated with the product demand data.

\* \* \* \* \*